United States Patent
Sakoda et al.

(10) Patent No.: US 10,417,600 B2
(45) Date of Patent: Sep. 17, 2019

(54) DELIVERY MANAGEMENT SYSTEM, INFORMATION PROCESSING APPARATUS, DELIVERY MANAGEMENT METHOD AND PROGRAM

(71) Applicant: NS Solutions Corporation, Tokyo (JP)

(72) Inventors: Masakazu Sakoda, Tokyo (JP); Akihiko Ono, Tokyo (JP)

(73) Assignee: NS Solutions Corporation, Tokyo (JP)

( * ) Notice: Subject to any disclaimer, the term of this patent is extended or adjusted under 35 U.S.C. 154(b) by 59 days.

(21) Appl. No.: 15/505,845

(22) PCT Filed: Aug. 21, 2015

(86) PCT No.: PCT/JP2015/073615
§ 371 (c)(1),
(2) Date: Feb. 22, 2017

(87) PCT Pub. No.: WO2016/072127
PCT Pub. Date: May 12, 2016

(65) Prior Publication Data
US 2017/0278045 A1 Sep. 28, 2017

(30) Foreign Application Priority Data
Nov. 7, 2014 (JP) .................................. 2014-227291

(51) Int. Cl.
*G06Q 10/00* (2012.01)
*G06Q 30/00* (2012.01)
(Continued)

(52) U.S. Cl.
CPC ........... *G06Q 10/08* (2013.01); *G06Q 10/083* (2013.01); *G06Q 20/382* (2013.01); *G06Q 20/40* (2013.01);
(Continued)

(58) Field of Classification Search
CPC ............. G06Q 10/083; G06Q 30/0601; G06Q 10/0833; G06Q 10/0835; G06Q 10/08355; G06Q 10/0832; G06F 21/31
See application file for complete search history.

(56) References Cited

U.S. PATENT DOCUMENTS

| | | | | |
|---|---|---|---|---|
| 6,807,530 B1* | 10/2004 | Shub | ...................... | G06Q 20/12 |
| | | | | 705/26.42 |
| 7,203,315 B1* | 4/2007 | Livesay | ............. | G06Q 30/0603 |
| | | | | 380/255 |
| 2006/0178994 A1* | 8/2006 | Stolfo | .................... | G06Q 10/08 |
| | | | | 705/50 |

FOREIGN PATENT DOCUMENTS

| | | | |
|---|---|---|---|
| JP | 2002-007904 A | 1/2002 | |
| JP | 2003-296637 A | 10/2003 | |

(Continued)

OTHER PUBLICATIONS

AlTawy, Riham, et al. Lelantos: A Blockchain-based Anonymous Physical Delivery System. Cryptology ePrint Archive, Report 2017/465, 2017. http://eprint. iacr. org/2017/465 (Year: 2017).*
(Continued)

*Primary Examiner* — George Chen
(74) *Attorney, Agent, or Firm* — Arent Fox LLP

(57) ABSTRACT

A delivery management system includes: a first accepting unit which accepts provisional information corresponding to true information regarding a delivery destination, and being different information from the true information; a first specifying unit which specifies a first identification information based on the provisional information accepted by the first accepting unit, with referring the first storage unit storing the first identification information and the provisional information while associating them; a second specifying unit which specifies a second identification information based on the first identification information specified by
(Continued)

the first specifying unit, with referring the second storage unit storing the second identification information and the first identification information while associating them; and a third specifying unit which specifies the true information based on the second identification information specified by the second specifying unit, with referring a third storage unit storing the second identification information and the true information while associating them, wherein the first storage unit, the second storage unit and the third storage unit are located at different places from one another.

4 Claims, 9 Drawing Sheets

(51) Int. Cl.
*G06Q 10/08* (2012.01)
*G06Q 30/06* (2012.01)
*G06Q 50/28* (2012.01)
*G06Q 20/38* (2012.01)
*G06Q 20/40* (2012.01)
*H04L 29/08* (2006.01)

(52) U.S. Cl.
CPC ........... *G06Q 20/401* (2013.01); *G06Q 30/06* (2013.01); *G06Q 50/28* (2013.01); *H04L 67/34* (2013.01)

(56) References Cited

FOREIGN PATENT DOCUMENTS

| | | |
|---|---|---|
| JP | 2004-078515 A | 3/2004 |
| JP | 2005-004714 A | 1/2005 |
| JP | 2009-087092 A | 4/2009 |

OTHER PUBLICATIONS

International Preliminary Report on Patentability of related International Patent Application No. PCT/JP2015/073615 dated May 18, 2017.

* cited by examiner

FIG.4

| TRUE ADDRESS ID | USER INFORMATION | | |
| --- | --- | --- | --- |
| | NAME | ADDRESS | TELEPHONE NUMBER |
| abc0001 | ○○○○ | ○-○ CHUO-KU, TOKYO | 03-**-*1 |
| abc0002 | △△△△ | □□101, △-△ CHIYODA-KU, TOKYO | 03-**-*2 |
| | △△△△ | △-△ 101 CHIYODA-KU, TOKYO | 03-**-*2 |
| ⋮ | ⋮ | ⋮ | ⋮ |

| PROVISIONAL ADDRESS ID | TRUE ADDRESS ID | SERVICE ID | DELIVERY COMPANY ID |
|---|---|---|---|
| 0001xyz | abc0001 | stu0001 | A COMPANY |
| 0002xyz | abc0001 | stu0002 | A COMPANY |
| 0003xyz | abc0002 | stu0001 | A COMPANY |
| ⋮ | ⋮ | ⋮ | ⋮ |

DELIVERY MANAGEMENT SYSTEM, INFORMATION PROCESSING APPARATUS, DELIVERY MANAGEMENT METHOD AND PROGRAM

CROSS-REFERENCE TO RELATED APPLICATIONS

This application is a National Stage entry of International Application No. PCT/JP2015/073615, filed Aug. 21, 2015, which claims priority to Japanese Patent Application No. 2014-227291, filed Nov. 7, 2014. The disclosures of the priority applications are incorporated in their entirety herein by reference.

TECHNICAL FIELD

The present invention relates to a delivery management system, a delivery management method and a program.

BACKGROUND ART

In recent years, usage of services such as internet shopping has increased, and accident such as leakage of personal information or the like occurs frequently according thereto. In particular, when a service accompanied by delivery of articles is used, it is necessary to notify a service provider of an address, but the address cannot be changed easily different from a mail address. Accordingly, the address is once passed to a list broker, a person receives damages such that a large number of unnecessary direct mails are sent without control.

In Patent Literature 1, there is proposed a camouflage purchasing method where an internet shop subsystem, a camouflage information provider subsystem, and a home delivery company subsystem are connected. According to a configuration described in Patent Literature 1, the home delivery company subsystem detects that destination information of a received delivery article is the camouflage information, and specifies the camouflage information provider subsystem. Then the home delivery company subsystem acquires information necessary for the delivery such as an original address of a customer terminal and a name from purchaser camouflage information to deliver to the customer.

CITATION LIST

Patent Literature

Patent Literature 1: Japanese Laid-open Patent Publication No. 2005-4714

SUMMARY OF INVENTION

Technical Problem

However, according to the configuration described in Patent Literature 1, there is a possibility that information linking between customer original information and the camouflage information is leaked out of the camouflage information provider subsystem by cyber-attack or unauthorized acquisition of information by an internal person. Namely, it is possible to acquire all necessary information by attacking one subsystem from a viewpoint of a person who tries to acquire information for unauthorized purposes. Accordingly, it becomes a soft target from a person who attempts the cyber-attack.

The present invention is made in consideration of the above-stated problems, and an object thereof is to improve robustness for leakage of personal information.

Solution to Problem

The present invention is a delivery management system which manages delivery of delivery articles, including: a first accepting unit which accepts provisional information corresponding to true information regarding a delivery destination, and being different information from the true information; a first storage unit which stores first identification information identifying the true information, and the provisional information while associating them; a first specifying unit which specifies the first identification information based on the provisional information accepted by the first accepting unit, with referring the first storage unit; a second storage unit which stores second identification information identifying the true information and being different from the first identification information, and the first identification information while associating them; a second specifying unit which specifies the second identification information based on the first identification information specified by the first specifying unit, with referring the second storage unit; a third storage unit which stores the second identification information and the true information while associating them; and a third specifying unit which specifies the true information based on the second identification information specified by the second specifying unit, with referring to the third storage unit, wherein the first storage unit, the second storage unit and the third storage unit are disposed at different places from one another.

Advantageous Effects of Invention

According to the present invention, it is possible to improve robustness for leakage of personal information.

BRIEF DESCRIPTION OF DRAWINGS

FIG. 4 is a view illustrating an example of a data configuration of a true address DB.

FIG. 9 is a view illustrating an example of a data configuration of an ID management DB according to the second embodiment.

DESCRIPTION OF EMBODIMENTS

Figure 1:
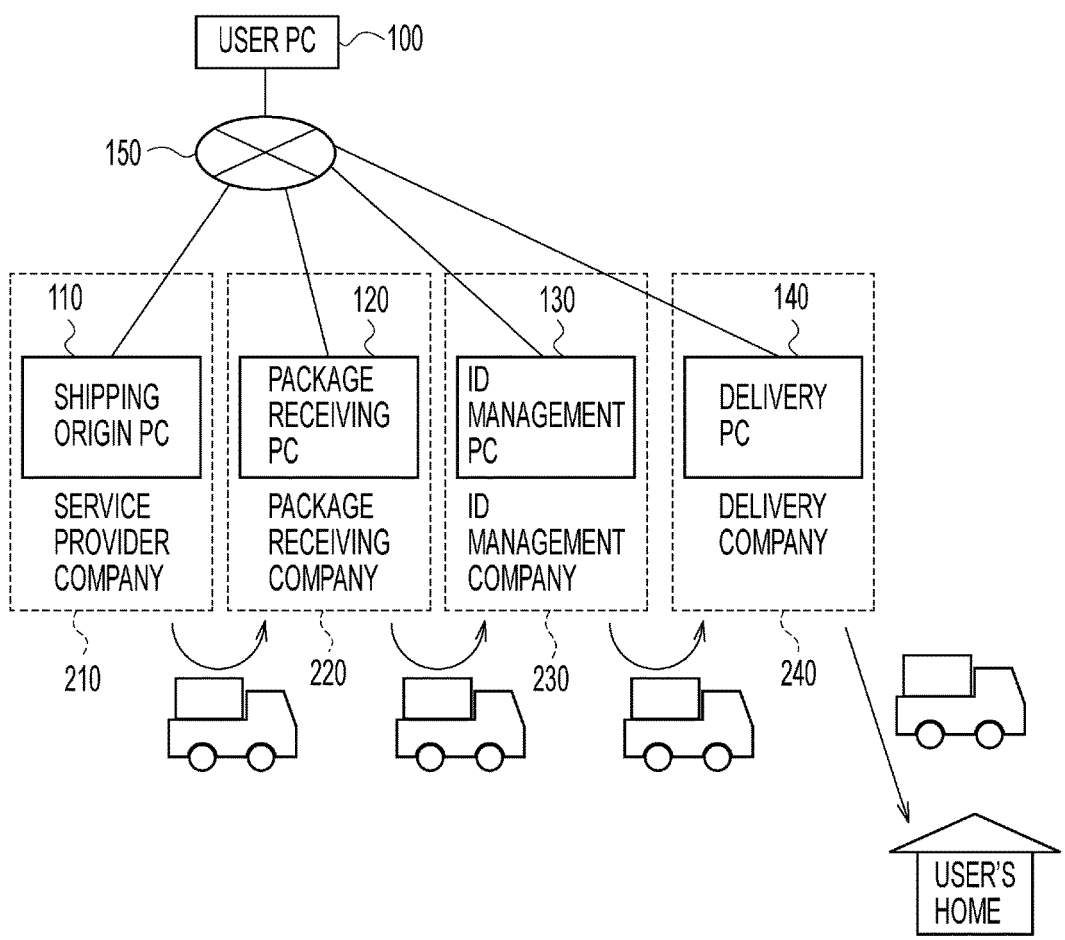
FIG. 1 is a view illustrating an overall configuration of a delivery management system.

FIG. 1 is a view illustrating an overall configuration of a delivery management system according to the present embodiment. The delivery management system according to the embodiment manages delivery of merchandises regarding purchasing when a user purchases a merchandise at a service provider company by using internet. The delivery management system includes a user PC 100, a shipping origin PC 110, a package receiving PC 120, an ID management PC 130, and a delivery PC 140. The user PC 100, the shipping origin PC 110, the package receiving PC 120, the ID management PC 130, and the delivery PC 140 are able to communicate through a network 150.

In the delivery management system according to the embodiment, the user instructs to ship the merchandise such that the user purchases the merchandise of a service provider company 210 by using the user PC 100, through the network 150. The merchandise is delivered from the service provider company 210 to a package receiving company 220. The merchandise is delivered to an address specified by the user further through an intermediary of an ID management company 230 and a delivery company 240. Here, the user PC 100 is an example of an information processing apparatus as a user terminal.

The shipping origin PC 110 is an information processing apparatus managed by the service provider company 210 where the user purchased the merchandise by using the user PC 100 through the network 150. The package receiving PC 120 is an information processing apparatus managed by the package receiving company 220. The ID management PC 130 is an information processing apparatus managed by the ID management company 230. The delivery PC 140 is an information processing apparatus managed by the delivery company 240. Here, the package receiving company 220, the ID management company 230, and the delivery company 240 are companies whose business owners are different from one another. Besides, the shipping origin PC 110, the package receiving PC 120, the ID management PC 130, and the delivery PC 140 are located at physically different places. For example, the package receiving PC 120 is located at A city, the ID management PC 130 is located at B city, and the delivery PC 140 is located at C city. Note that the package receiving PC 120, the ID management PC 130, and the delivery PC 140 are each an example of a management device which manages delivery of delivery articles.

Figure 2:
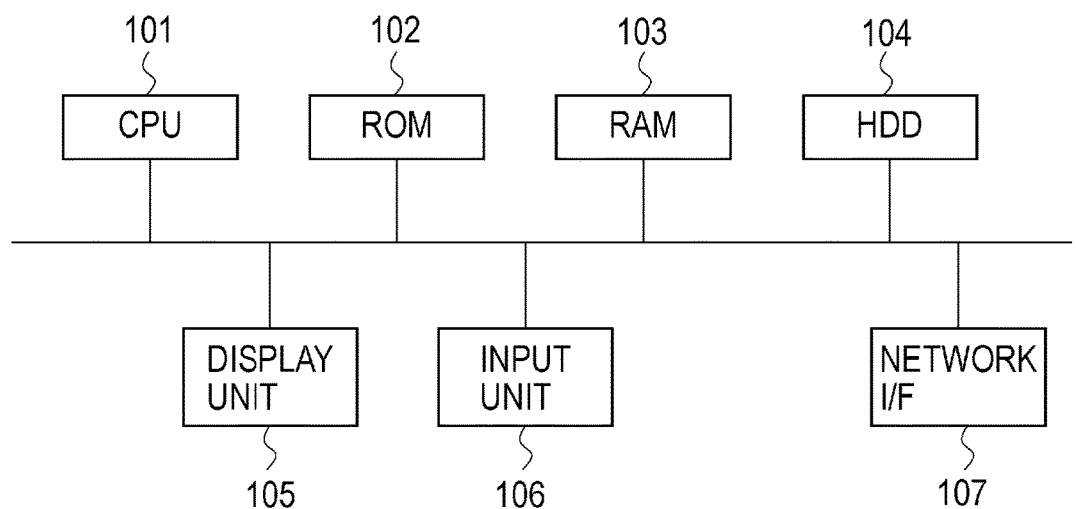
FIG. 2 is a view illustrating a hardware configuration of a user PC.

FIG. 2 is a view illustrating a hardware configuration of the user PC 100. The user PC 100 includes a CPU 101, a ROM 102, a RAM 103, an HDD 104, a display unit 105, an input unit 106, and a network I/F unit 107. The CPU 101 reads control programs stored in the ROM 102 and performs various processes. The RAM 103 is used as a main memory and a temporary storage area such as a work area of the CPU 101. The HDD 104 stores various information such as image data and various programs. Note that later-described functions and processes of the user PC 100 are enabled by the CPU 101 reading the programs stored in the ROM 102 or the HDD 104 and executing the programs.

The display unit 105 displays various information. The input unit 106 includes a keyboard and a mouse, and accepts various operations by the user. The network I/F unit 107 performs communication processes with external devices such as an image forming device through the network. Note that the hardware configurations of the shipping origin PC 110, the package receiving PC 120, the ID management PC 130, and the delivery PC 140 are the same as the hardware configuration of the user PC 100 described with reference to FIG. 2.

Figure 3:
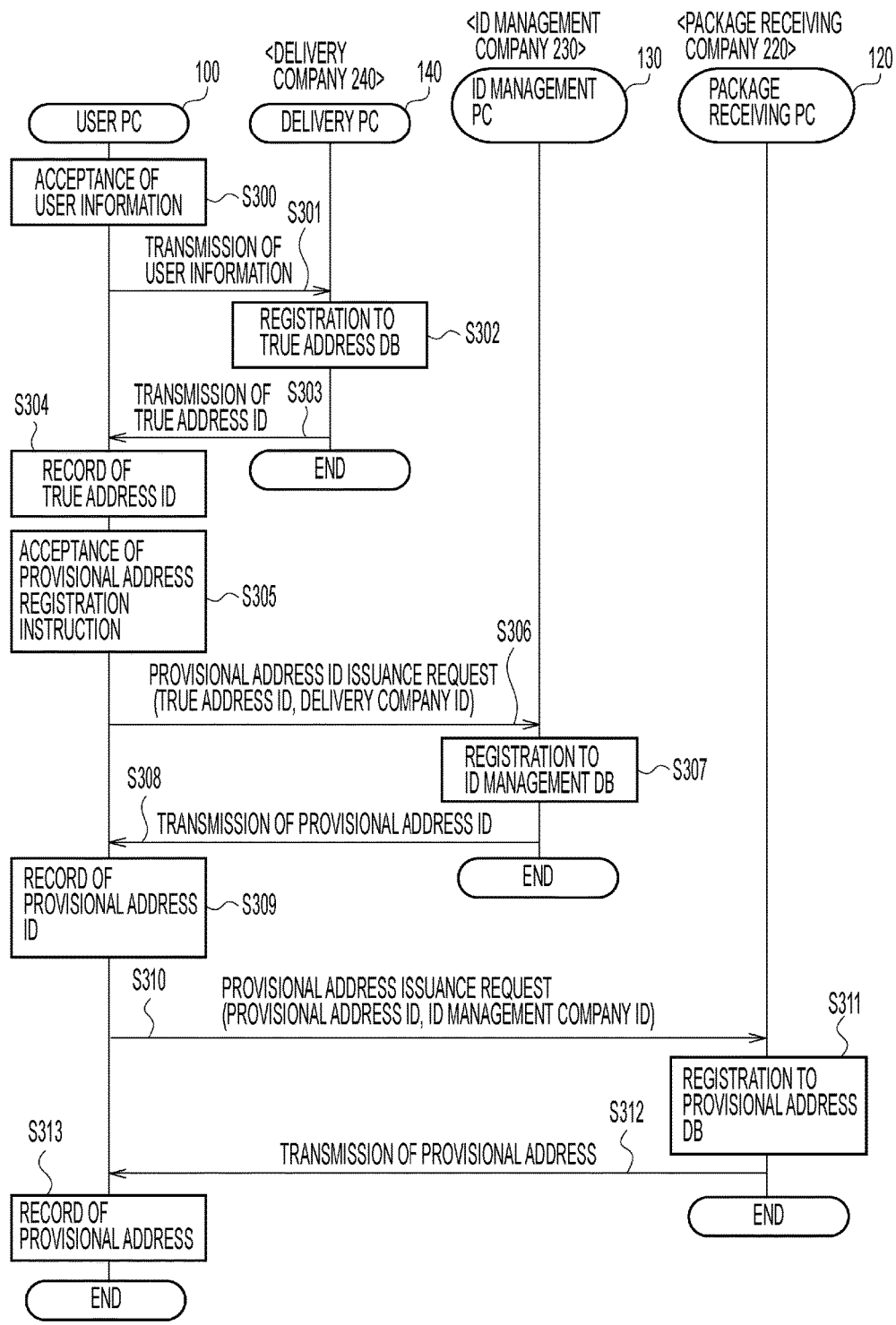
FIG. 3 is a flowchart illustrating a provisional address registration process.

FIG. 3 is a flowchart illustrating a provisional address registration process in the delivery management system. Here, a provisional address is an address which is registered to the service provider company 210 of a shipping origin of a merchandise instead of a true address so as to enable delivery of the merchandise to the true address without notifying the service providing company 210 of the true address. Namely, the provisional address is an address different from the real address (true address) specified as a delivery destination of the merchandise. Here, the true address is an example of true information, and the provisional address is an example of provisional information. Note that an application which manages the provisional address is installed in advance in the user PC 100. The application is executed, and thereby, the user PC 100 performs the following processes. Namely, in S300, the CPU 101 of the user PC 100 accepts input of user information in accordance with a user operation. A name, a telephone number, and so on of the user is contained in the user information in addition to a formal address (true address) of the user. Next, in S301, the CPU 101 of the user PC 100 transmits the user information to the delivery PC 140.

Next, in S302, the CPU 101 of the delivery PC 140 verifies that the user information is formal information, and associates the user information with a true address ID being identification information of the true address, and registers to a true address DB as a third storage unit. FIG. 4 is a view illustrating an example of a data configuration of a true address DB 400. The true address DB stores the true address ID and the user information while associating them. The true address DB 400 is, for example, stored in the HDD 104 or the like of the delivery PC 140. When the user information is new information, the CPU 101 of the delivery PC 140 newly issues a true address ID, associates the user information with the new true address ID, and registers to the true address DB 400.

Besides, when the user information is the same as the user information which is already registered to the true address DB 400 or there are orthographical variants, the received user information is registered to the true address DB 400 while associating with the true address ID which is associated with the already registered user information. Namely, when the orthographical variants occur or the like, there are registered a plurality of user information while being associated with the true address ID in the true address DB 400.

Returning to FIG. 3, in S302, when the registration of the user information is completed, the CPU 101 of the delivery PC 140 transmits the true address ID being associated with the received user information in the true address DB 400 to the user PC 100 in S303. In S304, the CPU 101 of the user PC 100 records the true address ID received in the S303 to the HDD 104 or the like of its own device.

Next, in S305, the CPU 101 of the user PC 100 accepts input of a provisional address registration instruction in accordance with the user operation. At this time, the CPU 101 of the user PC 100 further accepts input of an ID management company ID which identifies the ID management company 230 and a delivery company ID which identifies the delivery company 240 in accordance with the user operation. Next, in S306, the CPU 101 of the user PC 100 transmits a provisional address ID issuance request for the ID management PC 130. Here, the provisional address ID issuance request is information requesting issuance of a provisional address ID. The provisional address ID is identification information of the provisional address, namely, identification information of a corresponding true address. The provisional address ID issuance request includes the true address ID recorded in the S304 and the delivery company ID shown in the provisional address registration instruction.

Figure 5:
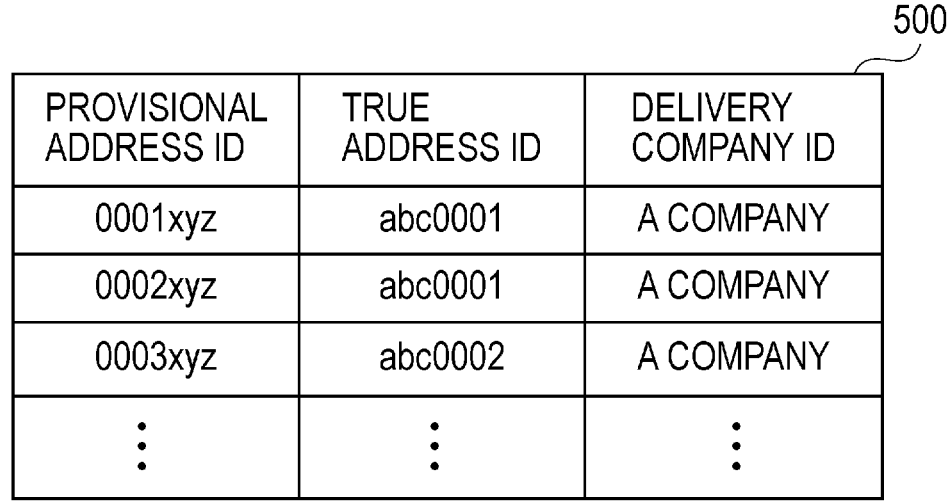
FIG. 5 is a view illustrating a data configuration of an ID management DB.

Next, in S307, the CPU 101 of the ID management PC 130 receives the provisional address ID issuance request, then verifies whether or not the true address ID shown in the provisional address ID issuance request is registered to an ID management DB as a second storage unit. FIG. 5 is a view illustrating a data configuration of an ID management DB 500. The ID management DB 500 stores the provisional address ID, the true address ID, and the delivery company ID while associating them. The ID management DB 500 is, for example, stored in the HDD 104 or the like of the ID management PC 130. When the true address ID shown in the provisional address ID issuance request is not registered to the ID management DB 500, the CPU 101 of the ID management PC 130 newly registers the true address ID shown in the provisional address ID issuance request to the ID management DB 500. The CPU 101 of the ID management PC 130 further issues a new provisional address ID, and registers the new provisional address ID to the ID management DB 500 while associating with the true address ID shown in the provisional address ID issuance request.

As illustrated in FIG. 5, the ID management DB 500 is also able to store a plurality of provisional address IDs while associating with one true address ID. For example, there is a case when the user wants to make a request to ship merchandises while specifying different provisional addresses for each of a plurality of service provider companies 210. In this case, the user may input the provisional address registration instruction every time when the user wants the issuance of the provisional address. The CPU 101 of the ID management PC 130 receives the plurality times of provisional address ID issuance requests, and registers the plurality of provisional address IDs for one true address ID corresponding thereto. For example, it is thereby possible to register the provisional address IDs for the number of service provider companies 210 which are used by the user.

Returning to FIG. 3, after the registration of the provisional address ID is completed in S307, the CPU 101 of the ID management PC 130 transmits the provisional address ID issued in the S307 to the user PC 100 in S308. In S309, the CPU 101 of the user PC 100 records the provisional address ID received in the S308 to the HDD 104 or the like of its own device. Next, in S310, the CPU 101 of the user PC 100 transmits a provisional address issuance request for the package receiving PC 120. Here, the provisional address issuance request includes the provisional address ID recorded in the S309 and the ID management company ID shown in the provisional address registration instruction.

Figure 6:
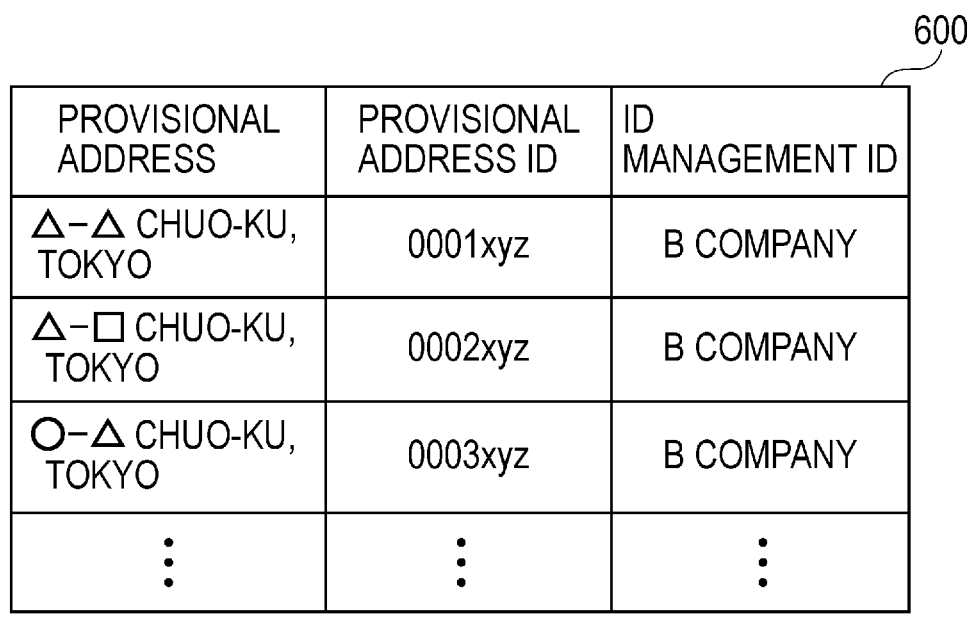
FIG. 6 is a view illustrating a data configuration of a provisional address DB.

Next, in S311, the CPU 101 of the package receiving PC 120 verifies that the provisional address ID shown in the provisional address issuance request is not registered to a provisional address DB as a first storage unit, and issues a new provisional address. FIG. 6 is a view illustrating a data configuration of a provisional address DB 600. The provisional address DB 600 stores the provisional address, the provisional address ID, and the ID management company ID while associating them. The provisional address DB 600 is stored in, for example, the HDD 104 or the like of the package receiving PC 120. The CPU 101 of the package receiving PC 120 registers the newly issued provisional address and the provisional address ID shown in the provisional address issuance request to the provisional address DB 600 while associating them.

After the registration of the provisional address is completed in the S311, the CPU 101 of the package receiving PC 120 transmits the provisional address issued in the S311 to the user PC 100 in S312. In S313, the CPU 101 of the user PC 100 records the provisional address received in the S312 to the HDD 104 or the like of its own device. Hereinabove, the provisional address registration process is completed.

Figure 7:
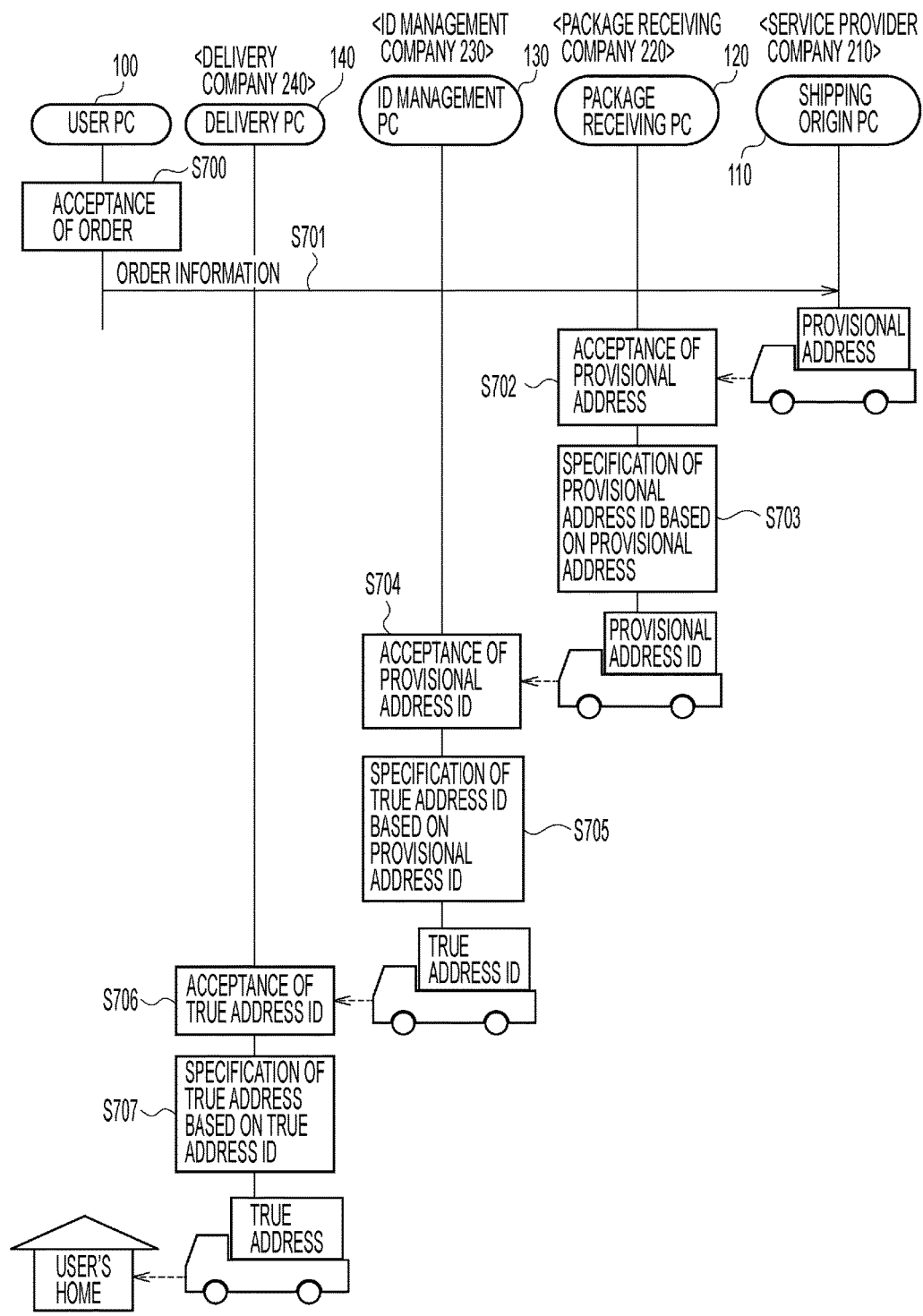
FIG. 7 is a flowchart illustrating a delivery management process of merchandises.

FIG. 7 is a flowchart illustrating a delivery management process of a merchandise by the delivery management system. In S700, the CPU 101 of the user PC 100 accepts order information of a merchandise in accordance with the user operation. A merchandise name where the user desires to purchase, user information, and a package receiving company name are included in the order information. Note that the user inputs the provisional address which is already registered in the provisional address registration process (FIG. 3) as the user information.

Next, in S701, the CPU 101 of the user PC 100 transmits the order information including the provisional address for the shipping origin PC 110 of the service provider company 210 being a merchandise retailer. Note that the order information may be transmitted from the user PC 100 to the shipping origin PC through an intermediary of other devices. Here, the order information is an example of a delivery instruction of a merchandise (delivery article). At the service provider company 210, an employee or the like receives the order information in the S701, then a label showing the provisional address regarding the order information as a destination is adhered on a merchandise or a wrapping thereof (hereinafter, called as a merchandise or the like) regarding the order information. The employee or the like ships the merchandise to the package receiving company 220 specified by the package receiving company name shown in the order information.

When the merchandise reaches the package receiving company 220, an employee or the like of the package receiving company 220 inputs the provisional address for the package receiving PC 120. In S702, the CPU 101 of the package receiving PC 120 accepts the input of the provisional address. Next, in S703, the CPU 101 of the package receiving PC 120 specifies the provisional address ID based on the input provisional address with referring the provisional address DB 600. The employee or the like of the package receiving company 220 peels off the label of the provisional address on the merchandise or the like, and newly adheres a label showing the provisional address ID specified in the S703 as the destination on the merchandise or the like. The employee or the like ships the merchandise to the ID management company 230.

When the merchandise reaches the ID management company 230, an employee or the like of the ID management company 230 inputs the provisional address ID for the ID management PC 130. In S704, the CPU 101 of the ID management PC 130 accepts the input of the provisional address ID. Next, in S705, the CPU 101 of the ID management PC 130 specifies the true address ID based on the input provisional address ID with referring the ID management DB 500. The employee or the like of the ID management company 230 peels off the label of the provisional address ID of the merchandise or the like, newly adheres a label showing the true address ID specified in the S705 as the destination on the merchandise or the like, and ships the merchandise to the delivery company 240.

When the merchandise reaches the delivery company 240, an employee or the like of the delivery company 240 inputs the true address ID for the delivery PC 140. In S706, the CPU 101 of the delivery PC 140 accepts the input of the true address ID. Next, in S707, the CPU 101 of the delivery PC 140 specifies the true address which is associated with the inputted true address ID with referring the true address DB 400. The employee or the like of the delivery company 240 peels off the label of the true address ID on the merchandise or the like, newly adheres a label showing the true address specified in the S707 as the destination on the merchandise or the like, and ships the merchandise to the true address. Hereinabove, the merchandise delivery management process is completed. Note that the processes in S702, S704, S706 are each an example of an acceptance process.

As described hereinabove, in the delivery management system according to the embodiment, it is impossible to specify the true address based on the provisional address without referring to the three DBs of the true address DB 400, the ID management DB 500, and the provisional address DB 600 in total. Namely, even when an unauthorized access is attempted by a third party for one DB from among the true address DB 400, the ID management DB 500, and the provisional address DB 600, the true address of the user will not be specified. Besides, the true address DB 400, the ID management DB 500, and the provisional address DB 600 are located at different places from one another, and therefore, a possibility that all information in the three DBs are leaked is extremely low, and it is possible to improve robustness for leakage of personal information.

Further, in the delivery management system according to the present embodiment, a merchandise is actually delivered to facilities of the respective companies 220, 230, 240, and the label is re-adhered at each facility. It is thereby prevented that label information is accumulated, and DB information where the provisional address and the true address are associated is built up.

As a first modification example of the first embodiment, the package receiving company 220, the ID management company 230, and the delivery company 240 being respective shipping addresses of the merchandise of the service provider company 210, the package receiving company 220, and the ID management company 230 may be defined in advance. In this case, the process to respectively register the delivery company ID and the ID management company ID to the ID management DB 500 and the provisional address DB 600 is not necessary. Besides, at the service provider company 210, the process that the shipping origin PC 110 accepts the specification of the package receiving company 220 from the user PC 100 is not necessary.

As a second modification example, when the received provisional address is registered to the provisional address DB 600, the package receiving PC 120 of the package receiving company recognizes that the address displayed on the label is the provisional address, and may deliver the merchandise to the ID management company 230 defined in advance. In this case, the process to register the ID management company ID to the provisional address DB 600 is not necessary.

As a third modification example, the provisional address may be set to an address of the package receiving company, the provisional address ID may be set to an address of the ID management company, and the true address ID may be set to an address of the delivery company. Also in this case, the process to respectively register the delivery company ID and the ID management company ID to the ID management DB 500 and the provisional address DB 600 is not necessary as same as the first modification example. Besides, at the service provider company 210, the process that the shipping origin PC 110 accepts the specification of the package receiving company 220 from the user PC 100 is not necessary as same as the first modification example.

As a fourth modification example, the delivery management system does not have to have the package receiving company 220 and the package receiving PC 120 when it is possible for the service provider company 210 to accept the registration of the provisional address ID as the address. In this case, the employee or the like of the service provider company 210 adheres the label showing the provisional address ID as the destination on the merchandise, and ships the merchandise to the ID management company 230.

As a fifth modification example, the delivery management system does not have to have the ID management company 230 and the ID management PC 130. In this case, the package receiving company 220 has the provisional address DB associating between the provisional address and the identification information, and the delivery company 240 has the true address DB associating between the identification information and the true address. Note that the identification information may be the true address ID, or may be the provisional address ID according to the embodiment. The package receiving PC 120 specifies the identification information based on the provisional address with referring the provisional address DB, and the delivery company 240 specifies the true address based on the identification information with referring the true address DB. Further, the employee or the like of the package receiving company 220 adheres a label showing the identification information as the destination on the merchandise or the like, and ships the merchandise to the delivery company 240.

As a sixth modification example, functions of each of the PCs 120, 130, 140 do not have to be provided by a server on-premises provided in each company, and it may be constituted such that they are provided by using cloud computing technologies.

For example, when the functions of each of the PCs 120, 130, 140 are provided as an individual private-cloud-type system, each of the DBs 400, 500, 600 is disposed as a physically different storage device.

Besides, for example, when the functions of each of the PCs 120, 130, 140 are provided as a public-cloud-type system, it is constituted such that the true address DB 400, the ID management DB 500 and the provisional address DB 600 are disposed at least at logically different places (storage areas which are independently managed), each of the functions of the PCs 120, 130, 140 enabled on a cloud is able to access only the DB used by each function, and not able to access the DBs used by the other functions.

As a seventh modification example, the package receiving company 220, the ID management company 230, and the delivery company 240 may be one company. Besides, when each of the companies 220, 230, 240 is held by the same business owner, the shipping origin PC 110, the package receiving PC 120, the ID management PC 130, and the delivery PC 140 may be located at different business offices. Further, in this case, the delivery PC 140 is to be located at the business office nearest to the true address, and it is preferable that the delivery PC 140 registers an address of the business office where the delivery PC 140 is located as the provisional address.

As an eighth modification example, a change of a medium for a notation of the destination of the merchandise or the like is not limited to the re-adhesion of the label. As another example, repacking to a box having a different destination notation may be performed.

As a ninth modification example, the delivery management system according to the embodiment is not limited to the delivery of merchandises purchased by the user. As other examples, it is applicable for various services such as delivery of merchandises which are lent in a rental service, delivery of articles from a user A to a user B.

As a tenth modification example, after the true address ID is issued, the delivery company 240 notifies the user of a password by mailing a postcard where the password is recorded, or the like. Then the true address ID may be activated by input of password by the user as a condition. Besides, in this case, the delivery PC 140 does not transmit the true address ID to the user PC 100 without the input of the password after an initial issuance of the true address ID. It is thereby possible to prevent leakage of the true address ID due to impersonation or the like. Besides, in this case, usage of the true address ID for the process of the provisional address ID issuance or the like may be made possible until the true address ID is activated. Note that the package receiving PC 120 requires the input of the password when the merchandise is actually shipped.

(Second Embodiment)

A delivery management system according to a second embodiment is one where issuances of a plurality of provisional addresses are possible for one true address as same as the delivery management system according to the first embodiment. This enables a usage method where the provisional address is assigned to each of the service provider companies 210. In the delivery management system according to the second embodiment, the issuance of the provisional address for the true address is limited by each service provider company 210, or by each service.

Figure 8:
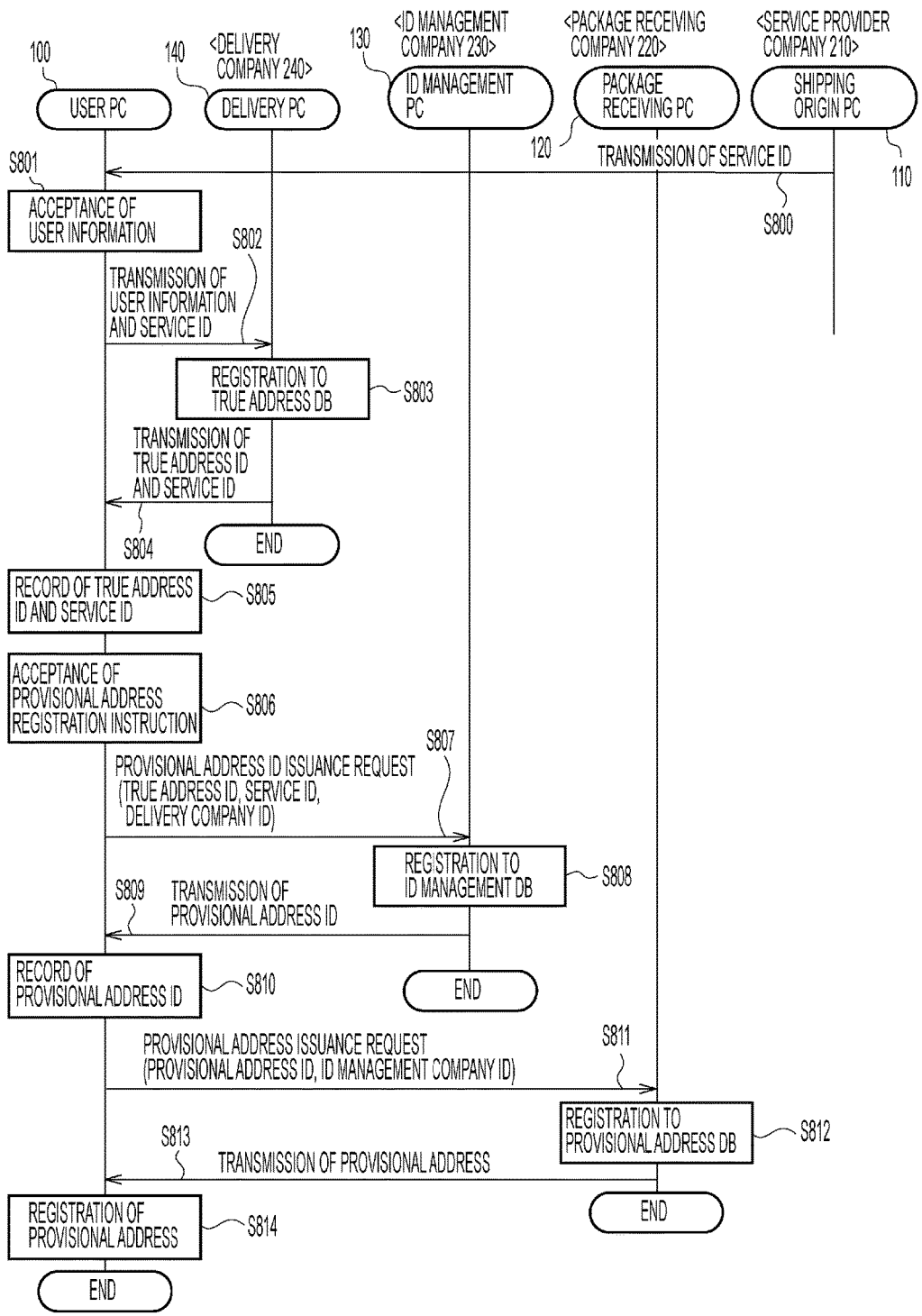
FIG. 8 is a flowchart illustrating a delivery management process according to a second embodiment.

FIG. 8 is a flowchart illustrating a delivery management process by the delivery management system according to the second embodiment. In S800, the CPU 101 of the shipping origin PC 110 of the service provider company 210 transmits service identification information (service ID) identifying the service provider company 210 or a service of the service provider company 210 in accordance with a request from the user PC 100. Next, in S801, the CPU 101 of the user PC 100 accepts input of user information in accordance with a user operation. Next, in S802, the CPU 101 of the user PC 100 associates the service ID received in the S800 and the user information accepted in the S801 to transmit to the delivery PC 140.

Next, in S803, the CPU 101 of the delivery PC 140 verifies that the user information and the service ID are formal information, and registers the user information and the service ID to the true address DB while associating with a true address ID. Next, in S804, the CPU 101 of the delivery PC 140 transmits the true address ID and the service ID to the user PC 100.

Next, in S805, the CPU 101 of the user PC 100 records the true address ID and the service ID received from the delivery PC 140. Next, in S806, the CPU 101 of the user PC 100 accepts input of a provisional address registration instruction in accordance with the user operation. At this time, the CPU 101 of the user PC 100 further accepts input of an ID management company ID identifying the ID management company 230 and a delivery company ID identifying the delivery company 240 in accordance with the user operation. Next, in S807, the CPU 101 of the user PC 100 transmits a provisional address ID issuance request for the ID management PC 130. Here, the provisional address ID issuance request includes the true address ID and the service ID recorded in the S805 and the delivery company ID shown in the provisional address registration instruction.

Next, in S808, the CPU 101 of the ID management PC 130 receives the provisional address ID issuance request, then verifies whether or not the true address ID shown in the provisional address ID issuance request is registered to an ID management DB. FIG. 9 is a view illustrating an example of a data configuration of an ID management DB 900 according to the second embodiment. The ID management DB 900 stores a provisional address ID, the true address ID, the service ID, and the delivery company ID while associating them. The CPU 101 of the ID management PC 130 newly registers the true address ID shown in the provisional address ID issuance request to the ID management DB 900 when the true address ID is not registered to the ID management DB 900. The CPU 101 of the ID management PC 130 further issues a new provisional address ID, and registers the provisional address ID to the ID management DB 900 while associating with the true address ID shown in the provisional address ID issuance request. At this time, the CPU 101 of the ID management PC 130 issues information which includes the service ID received together with the true address ID at a terminal as the provisional address ID.

Next, in S809, the CPU 101 of the ID management PC 130 transmits the provisional address ID to the user PC 100. Note that there is a case when a combination of the true address ID and the service ID shown in the provisional address ID issuance request is already registered to the ID management DB 900. In this case, the CPU 101 of the ID management PC 130 transmits the already issued provisional address ID for the combination of the true address ID and the service ID shown in the provisional address ID issuance request to the user PC 100 without issuing a new provisional address ID. Namely, the ID management PC 130 transmits the already issued provisional address ID for the combination of the true address ID and the service ID which is already received when there is received the provisional address ID issuance request including the combination of the already received true address ID and service ID in the S807.

Subsequently, processes of S810 to S814 are the same as the processes of the S309 to the S313 which are described with reference to FIG. 3 in the first embodiment. Besides, a configuration and processes of the delivery management system according to the second embodiment other than the above are the same as the configuration and the processes of the delivery management system according to the first embodiment.

As described hereinabove, in the second embodiment, only one provisional address can be issued for one combination of the service ID which corresponds to the service provider company 210 and the true address. It is thereby possible to avoid unfairness such that one user registers as a plurality of users by using the provisional addresses to receive a plurality of services when one service is provided for one user by the service provider company 210 at an initial user registration time.

<Other Embodiments>

In the present invention, for example, an overseas resident is able to purchase articles from a Japanese service provider company by registering an address in Japan as a provisional address. In this case, the delivery company knows that a delivery destination is overseas when the true address is specified in the S707. When the true address is overseas, a cost for home delivery becomes expensive, and therefore, it is desirable that a plurality of packages are delivered together as much as possible. For example, there may be constituted such that a BOX corresponding to a maximum size or weight which can be delivered at a predetermined fee is prepared at a warehouse of the delivery company for each user, and it is delivered to the true address in overseas at a timing when the BOX becomes full with packages. Besides, there may be constituted such that this BOX may be shared by a plurality of users whose true addresses in overseas are in a predetermined range, and it is delivered to the overseas address at a timing when the BOX becomes full with the packages of the plurality of users.

Besides, the present invention is enabled by performing the following processes. Namely, software (programs) enabling the functions of the above-stated embodiments is supplied to a system or an apparatus through network or various storage media. Then a computer (or a CPU, MPU and so on) of the system or the apparatus reads the programs to perform the processes.

As stated above, according to the above-stated each embodiment, it is possible to improve the robustness for the leakage of personal information.

Although preferred embodiments of the present invention have been described in detail, it should be understood that the present invention is not limited to these specific embodiments, and the various changes and modifications could be made hereto without departing from the spirit and scope of the invention.

The invention claimed is:

1. A delivery management system which manages delivery of delivery articles, comprising:
   a first accepting unit which accepts provisional information corresponding to true information regarding a delivery destination, the provisional information being different information from the true information;
   a first storage unit which stores first identification information identifying the true information and the provisional information, and associates the first identification information with the provisional information;
   a first specifying unit which specifies the first identification information associated with the provisional information in the first storage unit based on the provisional information accepted by the first accepting unit and references to the first storage unit;
   a second storage unit which stores second identification information identifying the true information and the first identification information, and associates the second identification information with the first identification information, the second identification information being different from the first identification information;
   a second specifying unit which specifies the second identification information associated with the first identification information in the second storage unit based on the first identification information specified by the first specifying unit and references to the second storage unit;
   a third storage unit which stores the second identification information and the true information, and associates the second identification information and the true information;
   a third specifying unit which specifies the true information associated with the second identification information in the third storage unit based on the second identification information specified by the second specifying unit and references to the third storage unit;
   a first receiving unit which receives the true information from a user terminal;
   a first issuance unit which issues the second identification information corresponding to the true information;
   a first registration unit which registers the true information received by the first receiving unit and the second identification information issued by the first issuance unit to the third storage unit, and associates the true information and the second identification information;
   a first transmission unit which transmits the second identification information to the user terminal
   a second receiving unit which receives an issuance request including the second identification information from the user terminal;
   a second issuance unit which issues the first identification information relative to the second identification information shown in the issuance request;
   a second registration unit which registers the second identification information shown in the issuance request and the first identification information issued by the second issuance unit to the second storage unit, and associates the second identification information and the first identification information; and
   a second transmission unit which transmits the first identification information to the user terminal,
   wherein the first storage unit, the second storage unit, and the third storage unit are located at different places from one another,
   wherein the second receiving unit receives an issuance request including the second identification information and service identification information from the user terminal,
   wherein the second issuance unit issues one first identification information for a combination of one second identification information shown in the issuance request and one service identification information, and
   wherein the second transmission unit transmits the already issued first identification information for the combination of the already received second identification information and the service identification information to the user terminal when the issuance request including the combination of the received second identification information and the service identification information is received by the second receiving unit.

2. The delivery management system according to claim 1, wherein the true information is information indicating a delivery destination address, and
   wherein the provisional information is information indicating a provisional address.

3. A delivery management system which manages delivery of delivery articles, comprising:
   a first accepting unit which accepts provisional information corresponding to true information regarding a delivery destination, the provisional information being different information from the true information;
   a first storage unit which stores first identification information identifying the true information and the provisional information, and associates the first identification information with the provisional information;
   a first specifying unit which specifies the first identification information associated with the provisional information in the first storage unit based on the provisional information accepted by the first accepting unit and references to the first storage unit;
   a second storage unit which stores second identification information identifying the true information and the first identification information and associates the second identification information with the first identification information, the second identification information being different from the first identification information;
   a second specifying unit which specifies the second identification information associated with the first identification information in the second storage unit based on the first identification information specified by the first specifying unit and references to the second storage unit;
   a third storage unit which stores the second identification information and the true information, and associates the second identification information and the true information;

a third specifying unit which specifies the true information associated with the second identification information in the third storage unit based on the second identification information specified by the second specifying unit and references to the third storage unit;

a first receiving unit which receives the true information from a user terminal;

a first issuance unit which issues the second identification information corresponding to the true information;

a first registration unit which registers the true information received by the first receiving unit and the second identification information issued by the first issuance unit to the third storage unit, and associates the true information and the second identification information;

a first transmission unit which transmits the second identification information to the user terminal a second receiving unit which receives an issuance request including the second identification information from the user terminal;

a second issuance unit which issues the first identification information relative to the second identification information shown in the issuance request;

a second registration unit which registers the second identification information shown in the issuance request and the first identification information issued by the second issuance unit to the second storage unit, and associates the second identification information and the first identification information;

a second transmission unit which transmits the first identification information to the user terminal, a third receiving unit which receives an issuance request including the first identification information from the user terminal;

a third issuance unit which issues provisional information corresponding to the first identification information;

a third registration unit which registers the first identification information received by the third receiving unit and the provisional information issued by the third issuance unit to the first storage unit, and associates the first identification information and the provisional information; and a third transmission unit which transmits the provisional information to the user terminal, wherein the first storage unit, the second storage unit, and the third storage unit are located at different places from one another.

4. The delivery management system according to claim 3, wherein the true information is information indicating a delivery destination address, and wherein the provisional information is information indicating a provisional address.

* * * * *